US012731565B2

(12) United States Patent
Kouthoofd et al.

(10) Patent No.: US 12,731,565 B2

(45) Date of Patent: Sep. 8, 2026

(54) PORTABLE INTERACTIVE MUSIC PLAYER

(71) Applicant: Teenage Engineering AB, Stockholm (SE)

(72) Inventors: Jesper Kouthoofd, Stockholm (SE); David Eriksson, Stockholm (SE); David Möllerstedt, Stockholm (SE); Jonatan Blomster, Bagarmossen (SE); Marcus Nilsson, Stockholm (SE); Oscar Ahlgren, Stockholm (SE)

(73) Assignee: Teenage Engineering AB, Stockholm (SE)

( * ) Notice: Subject to any disclaimer, the term of this patent is extended or adjusted under 35 U.S.C. 154(b) by 1065 days.

(21) Appl. No.: 17/797,156

(22) PCT Filed: Feb. 4, 2021

(86) PCT No.: PCT/SE2021/050081

§ 371 (c)(1),
(2) Date: Aug. 3, 2022

(87) PCT Pub. No.: WO2021/162606

PCT Pub. Date: Aug. 19, 2021

(65) Prior Publication Data

US 2023/0050370 A1 Feb. 16, 2023

(30) Foreign Application Priority Data

Feb. 10, 2020 (SE) .................................... 2050138-3

(51) Int. Cl.

| | |
|---|---|
| ***G10H 1/00*** | (2006.01) |
| ***G10H 1/32*** | (2006.01) |
| ***G10H 1/36*** | (2006.01) |

(52) U.S. Cl.

CPC ............. *G10H 1/0025* (2013.01); *G10H 1/32* (2013.01); *G10H 1/368* (2013.01);

(Continued)

(58) Field of Classification Search

CPC .... G10H 1/32; G10H 1/368; G10H 2210/125; G10H 2230/015; G10H 2240/321

See application file for complete search history.

(56) References Cited

U.S. PATENT DOCUMENTS

| | | | |
|---|---|---|---|
| 5,986,200 | A | 11/1999 | Curtin |
| 7,076,035 | B2 | 7/2006 | Loudermilk |

(Continued)

FOREIGN PATENT DOCUMENTS

| | | | |
|---|---|---|---|
| CA | 2485073 | A1 | 11/2003 |
| WO | 03094413 | A2 | 11/2003 |
| WO | 2007112420 | A2 | 10/2007 |

OTHER PUBLICATIONS

Swedish Office Action dated Aug. 31, 2023 for SE Application No. 2050138-3, 5 pages.

(Continued)

*Primary Examiner* — Jianchun Qin

(74) *Attorney, Agent, or Firm* — RMCK Law Group, PLC

(57) ABSTRACT

The present disclosure relates to an interactive music player, the interactive music player adapted to allow a user to control and mix a plurality of simultaneously played audio tracks. The present disclosure also relates to a corresponding method and computer program product.

11 Claims, 2 Drawing Sheets

(52) U.S. Cl.
CPC . *G10H 2210/125* (2013.01); *G10H 2230/015* (2013.01); *G10H 2240/321* (2013.01)

(56) References Cited

U.S. PATENT DOCUMENTS

| | | | | |
|---|---|---|---|---|
| 7,136,482 | B2 * | 11/2006 | Wille | H04M 19/04<br>379/373.02 |
| 7,176,372 | B2 | 2/2007 | Georges | |
| 9,967,044 | B1 | 5/2018 | Gray | |
| 2003/0063066 | A1 | 4/2003 | Brown | |
| 2007/0218878 | A1 | 9/2007 | Khawand et al. | |
| 2007/0283799 | A1 * | 12/2007 | Carruthers | G10H 1/0083<br>84/645 |
| 2008/0205681 | A1 | 8/2008 | Norberg et al. | |
| 2011/0029867 | A1 | 2/2011 | Park | |
| 2012/0040718 | A1 | 2/2012 | Ramirez et al. | |
| 2013/0044883 | A1 | 2/2013 | Lindahl et al. | |
| 2016/0050494 | A1 | 2/2016 | McCorkle et al. | |
| 2019/0182552 | A1 | 6/2019 | Johnsen et al. | |

OTHER PUBLICATIONS

PCT International Search Report and Written Opinion for International Application No. PCT/SE2021/050081 mailed Apr. 14, 2021, 11 pages.
Extended European Search Report dated Jan. 30, 2024 for EP Application No. 21753692.9, 8 pages.

* cited by examiner

PORTABLE INTERACTIVE MUSIC PLAYER

CROSS-REFERENCE TO RELATED APPLICATIONS

This application is a 371 U.S. National Stage of International Application No. PCT/SE2021/050081, filed Feb. 4, 2021, which claims priority to Swedish Patent Application No. 2050138-3, filed Feb. 10, 2020. The disclosures of each of the above applications are incorporated herein by reference in their entirety.

TECHNICAL FIELD

The present disclosure relates to a portable interactive music player, the portable interactive music player adapted to allow a user to control and mix a plurality of simultaneously played audio tracks. The present disclosure also relates to a corresponding method and computer program product.

BACKGROUND

Multi-track recording technology provides flexibility to record music as individual audio tracks, either together or independently, and then mix the audio tracks to produce a desired compilation of music for distribution. The distributed versions will normally have a reduced number of tracks: a single track in the case of mono-sound, two tracks for stereo sound and typically six tracks for a surround sound system.

Generally, the distributed versions may be provided to an end user as "transferrable media" over the Internet using an online music distribution service such as e.g. Spotify, Apple Music, Google Play Music, etc., where then the end user may consume the music using e.g. a mobile device such as a mobile phone. By means of said online music distribution service, it is generally easier to distribute and consume music, as compared to before when music was only distributed using "fixed media", such including vinyl records, cassettes or compact discs.

However, when moving from fixed media to transferrable media a part of the end user experience of owning a piece of music was lost. In addition, transferrable media is generally provided in a lower quality as compared fixed media, at least as compared to what is possible by means of vinyl records and compact discs. That said, there is nowadays a trend for some artists to move back toward releasing vinyl records, where the music business is seeing yearly increase above 10% in sales of vinyl records. Independent on if the music is provided to the end user as fixed media or transferrable media, the possibility for the end user to interact with the music is limited. Such interaction is normally limited to other artists (such as DJs), using expensive mixing equipment allowing further loops, beats, sounds, etc. to be mixed with distributed version of the music.

With the above in mind, it would be desirable to allow for a typical end user to be allowed to better interact with the music, further heightening the listening experience for the end user, specifically in relation to consumption of fixed media music.

SUMMARY

According to an aspect of the present disclosure, it is therefore provided a portable interactive music player adapted to output a mixed audio stream, comprising memory means, output means, a first and a second interface means controllable by a user, a control unit connected to the memory means, the output means and the first and a second user interface mean and the output means, and a housing, the memory means and the control unit arranged within the housing, and the first and the second interface means controllable from an outside of the housing, wherein the memory means is adapted to store a first and a second audio stream, the control unit is adapted to receive a first and a second control signal from the first and the second interface means, respectively, the control unit is adapted to simultaneously play the audio streams stored at the memory means, the control unit is adapted to form the mixed audio stream from the simultaneously played first and the second audio stream and based on the first and the second control signal, and the control unit is adapted to output the mixed audio stream using the output means.

The present disclosure is based upon the realization that it would be desirable to allow a user to more easily interact with the music with the purpose of heightening the overall music consumption. This is in line with the present disclosure made possible by allowing multiple audio streams to be stored at the memory means, and once listened to the audio streams are played synchronously (by handing/acquiring/outputting the audio streams in parallel) but dependent on the input provided by the user using the interface means. Advantages following such an implementation is thus that the end user will feel more involved in the artists creation process when listening to (the artist) music. In addition, also the artist will benefit from the interaction of the user, possibly allowing the artist to be further inspired in his/her music creation.

Accordingly, in line with the present disclosure it is advantageous to at least allow each of the audio streams to have a thereto dedicated interface means. Thus, in one embodiment of the present disclosure the first audio stream is mixed dependent on the first control signal and the second audio stream is mixed dependent on the second control signal.

The dependence between the control signal and the audio stream may for example be related to controlling an amplitude of the stream. In such an embodiment, controlling the interface means between a maximum end point and a minimum end point of the interface means will control "how much of" that specific audio stream that will be combined/mixed with the further audio stream.

It may however, in line with the present disclosure, be possible to allow the interface means to control other features of the audio stream, such as a speed, a delay, etc. of the respective audio stream.

In some embodiments of the present disclosure the memory means stores a first and a second audio stream, and the portable interactive music player comprises a corresponding and related first and second interface means. It should however be understood that the memory means may store further audio stream and the portable interactive music player may comprise further corresponding and related interface means. In some embodiments it may be possible to include four audio streams and four thereto related interface means.

In some embodiments the audio streams may for example be stored at the memory means as separate MP3 or WAV files. Other audio stream formats are of course possible and within the scope of the present disclosure. It should also be understood that the plurality of audio streams may be stored as a single file at the memory means, where the content of the separate audio streams for example could be separable using e.g. metadata comprised with (or stored separately of) such a combined file.

Furthermore, a plurality of separate-but-related or combined audio files may be stored with the memory means. As such, e.g. an artist may allow a part of or a full record to be stored with the portable interactive music player. The number of audio files stored at the memory means may as such be dependent on the capacity of the memory means and the quality of the audio streams.

As a non-limiting example if selecting four audio streams, it could be possible to allow the first audio stream to comprise vocals for a music track, the second audio stream to comprise a base beat portion of the music track, the third audio stream to comprise audio for a first instrument, and the fourth audio stream comprise audio for a second instrument. If arranging the second-fourth interface means towards the minimum end point of the respective interface means it may be possible to (completely) suppress the base beat portion as well as the first and the second instrument, as such heightening the vocals. Corresponding manipulation of the mixed audio stream is accordingly possible based on a setting of the respective interface means.

Preferably, the portable interactive music player further comprises an audio connector adapted to receive an audio plug, wherein the audio connector is connected to the control unit. The audio connector preferably comprises a 3.5 mm socket. The control unit may in turn be adapted to receive a further audio stream once an electrical connection has been formed between the audio connector and an external audio source. The external source may in some embodiments be selected to be one of a music sequencer or a drum machine. Other external sources are of course possible and within the scope of the present disclosure. For example, in some embodiments the external source is a MIDI device or MIDI instrument. In such an embodiment the control unit is adapted to receive and process MIDI signals received from the MIDI instrument/device and use when forming the mixed audio stream.

It is further desirable to allow the further audio stream that is received at the audio connector to be comprised with the mixed audio stream such as mixed together with e.g. the first-fourth audio stream, possibly treated as a fifth audio stream.

In some embodiments it may be possible to reverse the functionality of the audio connector, thereby allowing the audio connector to effectively functioning as the output means. The audio connection could thereby be connected to e.g. a pair of headphones, or other audio reproduction means, such as a speaker.

In line with the present disclosure, it may of course be possible to arrange the portable interactive music player to comprise more than a single audio connector, such as two connectors. Thus, more than the above mentioned fifth audio stream (such as a sixth audio stream) may be combined with the mixed audio stream. Additionally, in reversing the functionality of the of such a plurality of audio connectors it may be possible to allow e.g. two separate users to each connect headphones to a separate audio connector.

It could of course be possible, and within the scope of the present disclosure to allow different output audio connectors to deliver different mixed audio stream. For example, a first (output) audio connector could provide a stream mixed being a mix of the first and the second audio stream, whereas a second (output) audio connector could provide a stream mixed being a mix of the third and the fourth audio stream. Further corresponding implementations are possible and within the scope of the present disclosure.

However, it may in some embodiments be more advantageous to arrange the portable interactive music player to instead or also comprise a Bluetooth transceiver that is arranged to function as the output means. Accordingly, using such an implementation the portable interactive music player may be connected to e.g. so-called wireless Bluetooth speakers or headphones, etc.

To allow the interactive music player to be truly portable, it is desirable to further arrange a battery within the housing, where the battery is provided for powering the portable interactive music player.

It may further be desirable to arrange the portable interactive music player to further comprise a speed interface means controllable from an outside of the housing, wherein the control unit is adapted to receive a speed control signal from the speed interface means for controlling a speed of the mixed audio stream. In some embodiments a single speed interface means may be arranged to control the overall speed of the mixed audio stream. However, it could be possible to combine control signals from e.g. one of the interface means with the speed control signal for only adjusting the speed of one the audio streams.

Optionally it may further be possible to allow the portable interactive music player to also comprise a display unit connected to the control unit, wherein the control unit is further adapted to form a visualization of the mixed audio stream to be displayed at the display unit. For example, the visualization may be a waveform of the mixed audio stream currently being outputted using the output means. It may of course be possible to allow the display unit to visualize any other type of information, such as an overall beat of the mixed audio stream, etc. In some embodiments it may for example be possible to allow the display unit to only visualize information relating to a single audio stream.

In some embodiments of the present disclosure the audio streams are pre-stored at the memory means once received by the user, such as during manufacturing of the portable interactive music player. However, it may also as an alternative be possible to equip the portable interactive music player with a high-speed data port for receiving the audio streams to be stored at the memory means of the portable interactive music player. As such, the user could possibly connect the portable interactive music player to e.g. a computer or similar for downloading further and/or other audio streams to the portable interactive music player. In some embodiments the high-speed data port may have double functionality and may as such be used for charging the battery.

The portable interactive music player could possibly further be provided with means for establishing a networked communication with e.g. a remote server. As such, further audio streams could possibly be downloaded from the remote server, as compared to using the high-speed data port. The remote server could also, possibly, be allowed to at least partly monitor and/or control the functionality of the portable interactive music player. The networked communication is preferably wireless, implementing e.g. a Wi-Fi or mobile communication protocol.

According to another aspect of the present disclosure, there is provided a computer implemented method for operating a computer implemented method for operating a portable interactive music player, the portable interactive music player comprising memory means, output means, a first and a second interface means controllable by a user, a control unit connected to the memory means, the output means and the first and a second user interface mean, and the output means, and a housing, the memory means and the control unit arranged within the housing, and the first and the second interface means controllable from an outside of the housing, wherein the method comprises storing a first and a second audio stream at the memory means, receiving, at the control unit, a first and a second control signal from the first and a second interface means, respectively, simultaneously playing, using the control unit, the audio streams stored at the memory means, forming, using the control unit, the mixed audio stream from the simultaneously played first and the second audio stream and based on the first and the second control signal, and outputting, using the control unit and the output means, the mixed audio stream. This aspect of the present disclosure provides similar advantages as discussed above in relation to the previous aspects of the present disclosure.

According to a further aspect of the present disclosure, there is provided a computer program product comprising a non-transitory computer readable medium having stored thereon computer program means operating a portable interactive music player, the portable interactive music player comprising memory means, output means, a first and a second interface means controllable by a user, a control unit connected to the memory means, the output means and the first and a second user interface mean, and the output means, and a housing, the memory means and the control unit arranged within the housing, and the first and the second interface means controllable from an outside of the housing, wherein the computer program product comprises code for storing a first and a second audio stream at the memory means, code for receiving, at the control unit, a first and a second control signal from the first and a second interface means, respectively, code for simultaneously playing, using the control unit, the audio streams stored at the memory means, code for forming, using the control unit, the mixed audio stream from the simultaneously played first and the second audio stream and based on the first and the second control signal, and code for outputting, using the control unit and the output means, the mixed audio stream. Also this aspect of the present disclosure provides similar advantages as discussed above in relation to the previous aspects of the present disclosure.

The control unit is preferably an ASIC, a microprocessor or any other type of computing device. A software executed by the control unit for operating the inventive system may be stored on a computer readable medium, being any type of memory device, including one of a removable nonvolatile random-access memory, a hard disk drive, a floppy disk, a CD-ROM, a DVD-ROM, a USB memory, an SD memory card, or a similar computer readable medium known in the art.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which.

DETAILED DESCRIPTION

Figure 1:
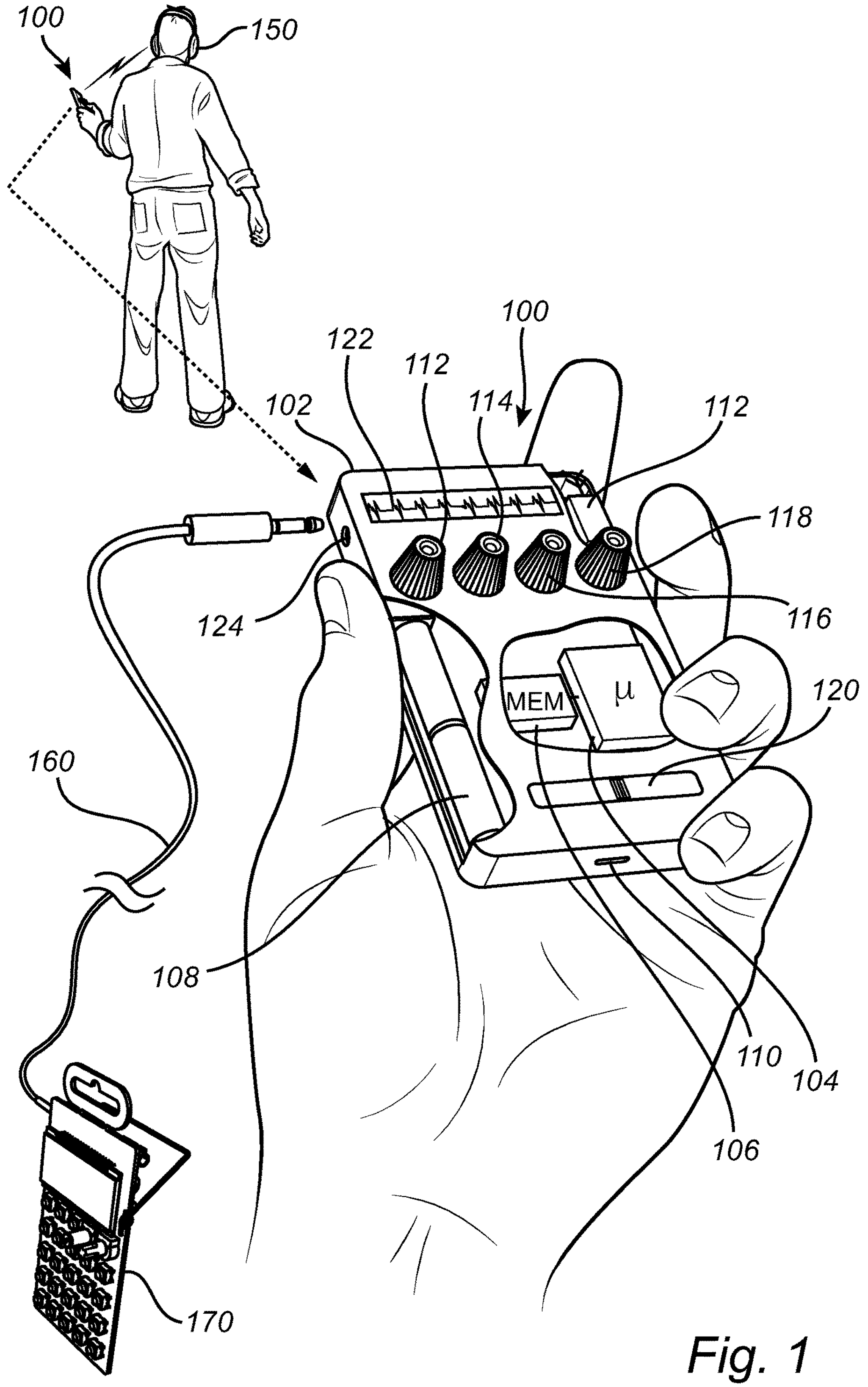
FIG. 1 schematically exemplifies a portable interactive music player according to an embodiment of the present disclosure.

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness, and fully convey the scope of the present disclosure to the skilled person. Like reference characters refer to like elements throughout.

Turning now to the drawings and to FIG. 1 in particular, there is schematically illustrated an example embodiment of a portable interactive music player 100, the interactive music player 100 comprising a housing 102. Inside the housing 102 there is arranged a control unit 104 and a thereto connected memory means 106, such as for example an electronic data storage device, such as a flash memory. In some embodiments the memory means 106 is integrated with the interactive music player 100, however it could possibly in some (non-illustrated) embodiments be detachable. In such an embodiment the memory means 106 could be a detachable memory card.

In line with the present disclosure, the memory means 106 holds a plurality of audio streams. As discussed above, the audio streams may for example be stored at the memory means as separate MP3 or WAV files. Other audio stream formats are of course possible and within the scope of the present disclosure. It should also be understood that the plurality of audio streams may be stored as a single file at the memory means, where the content of the separate audio streams for example could be separable using e.g. metadata comprised with (or stored separately of) such a combined file.

For reference, the control unit 104 may for example be manifested as a general-purpose processor, an application specific processor, a circuit containing processing components, a group of distributed processing components, a group of distributed computers configured for processing, a field programmable gate array (FPGA), etc. The processor may be or include any number of hardware components for conducting data or signal processing or for executing computer code stored in memory. The memory may be one or more devices for storing data and/or computer code for completing or facilitating the various methods described in the present description. The memory may include volatile memory or nonvolatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein. In some embodiments the interactive music player 100 comprises a plurality of control units together used for providing the desired functionality if the interactive music player 100.

The housing 102 further holds at least one battery 108 for powering the interactive music player 100, making the interactive music player 100 truly portable. It is preferred to use a chargeable battery. Such a chargeable battery may for example be charged using a connection port 110 arranged with the housing 102.

The housing 102 may further hold output means 112 for allowing a mixed audio stream to be provided to a user. As indicated above, the output means 112 may in some embodiments comprise a Bluetooth transceiver, for example useful for connecting to a user's wireless headphones 150 as exemplified in FIG. 1. It is of course possible and in line with the present disclosure to implement other types of wireless communication protocols, present or future.

Furthermore, in FIG. 1 the interactive music player 100 is illustrated as comprising a first 112, a second 114, a third 116 and a fourth 118 interface means, where the interface means 112, 114, 116, 118 are connected to the control unit 104. At least a portion of the interface means 112, 114, 116, 118 face an outside of the housing 102 and are as such controllable by the user. In FIG. 1 the interface means 112, 114, 116, 118 are illustrated as rotatable knobs. It would of course be possible to implement the interface means 112, 114, 116, 118 using other buttons, sliders, etc., as is suitable for the specific implementation in mind.

Additionally, there is in a corresponding manner comprised a speed interface means 120 also controllable from the outside of the housing 102. In a corresponding manner, the speed interface means 120 is connected to the control unit 104. The speed interface means 120 is in FIG. 1 implemented as a slider. However, it could be possible to allow the speed interface means 120 to be implemented as a resilient button having a first and a second end point and a normalized center point (sometimes referred to as a "rocker").

Still further, the interactive music player 100 may in some embodiments optionally be provided with a display unit 122, in turn connected to the control unit 104. The control unit 104 may in such an embodiment be arranged to form a visualization of at least a part of the mixed audio stream that is provided to the user. In some embodiments such a visualization may include a waveform being representative of the mixed audio stream. The waveform is then preferably displayed at the display unit 122 simultaneously as the mixed audio stream is delivered to the user (and preferably synchronously with).

Furthermore, the interactive music player 100 may in some embodiments optionally be provided with an audio connector 124 adapted to receive an audio plug. The audio plug may in turn be part of a cable 160 allowing the audio connector 124 to be connected to an external device, such as a music sequencer or a drum machine 170. The interactive music player 100, the cable 160 and the sequencer or a drum machine 170 may in some embodiments together form a portable music arrangement.

When receiving data from the external device, it may in some embodiments be preferred to allow the control unit to synchronize the received data with the audio streams. Such an embodiment will allow the received data to follow the overall beat of the audio streams (and thus the mixed audio stream).

Accordingly, in some embodiments the control unit 104 may be adapted to process the data received from the external device to synchronize the received data when mixing it with the other audio stream. Such a functionality could in some embodiments comprise buffering the received data and to find and adapt the beat of the received data to correspond to the beat of the other audio streams.

In some embodiments the interactive music player 100 may also be provided with a speaker element (not shown) arranged inside the housing. Possibly, the interactive music player 100 may also comprise a microphone (not shown) that it adapted to receive sounds external from the interactive music player 100. As such, e.g. the user may sample external sounds or be allowed to include his/her own vocals to be combined with the other audio streams. Also in such an embodiment it may be desirable to buffer the data from the microphone and possibly find and adapt the beat of the received data to correspond to the beat of the other audio streams.

Additionally, the connection port 110 may in some embodiments allow the interactive music player 100 to be connected to e.g. a computer, a tablet, etc. As such, it could be possible to interact with the memory means 106. For example, it may in some embodiments be possible to upload further audio streams from the computer to the memory means 104. The connection port 110 may in such an embodiment be a high-speed data port.

In some embodiments it may however be possible to integrate further communication means with the interactive music player 100, such as for example for allowing the interactive music player 100 to communicated with using network communication, such as wireless communication using e.g. Wi-Fi or similar.

In some embodiments the control unit 102 may also implement a synthesizer functionality. In such an embodiment it will typically be desirable to allow the interactive music player 100 to comprise a further set of interface means (typically buttons) for allowing control of the synthesizer functionality. It may however be possible to allow the above mentioned MIDI signals (possibly received at the audio connector 124) to be provide as control signals to the synthesizer functionality implemented by the control unit 102.

Figure 2:
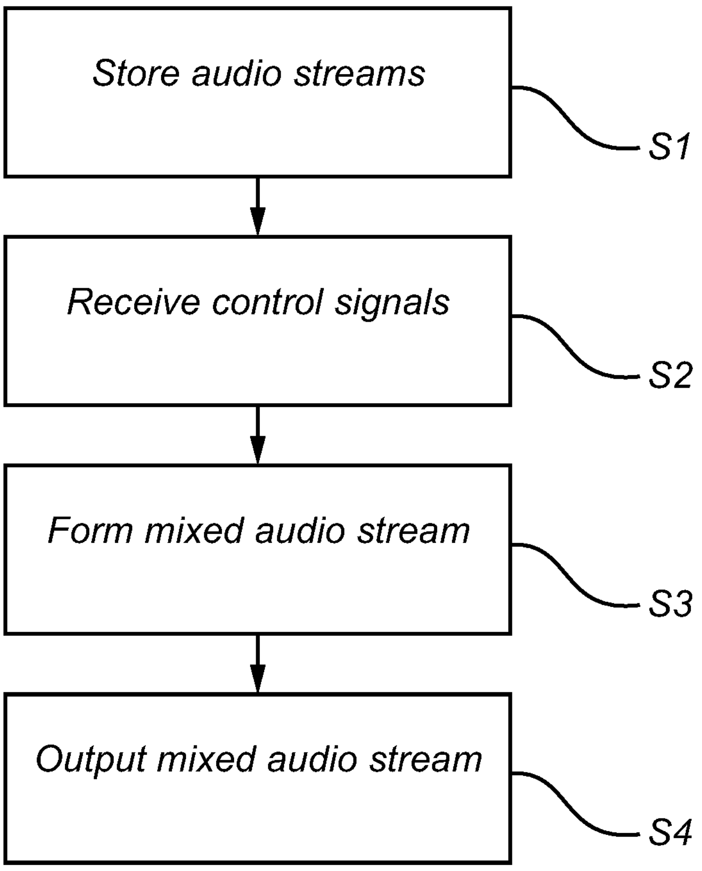
FIG. 2 is a flowchart illustrating the operation of the portable interactive music player according to the present disclosure.

During operation of the interactive music player 100, with further reference to FIG. 2, the audio streams are stored, S1, at the memory means 104. This storage may be performed during manufacturing of the interactive music player 100, or as indicated above using connection port 110 or other communication means.

Independent of the above, before the audio streams are stored at the memory means 104, it is desirable that the artist selects how the created audio should be segmented into the plurality of different audio streams. As a non-limiting example, the artist may select to segment the created audio into four different audio streams for subsequent storage at the memory means 104. For example, the first audio stream may be arranged to comprise vocals for a music track, the second audio stream to comprise a base beat portion of the music track, the third audio stream to comprise audio for a first instrument, and the fourth audio stream comprise audio for a second instrument. Other combinations/segmentations are of course possible and within the scope of the present disclosure.

Once the audio streams are stored at the memory means 104, it is possible for the user to interact with the music player 100. The user first activates the music player 100. The user may then interact with the interface means 112, 114, 116, 118. Once interacting with the interface means 112, 114, 116, 118, corresponding first, second, third and fourth control signals are formed. The control signals are in turn received, S2, at the control unit 104.

The control unit 104 will then use the control signals when forming, S3, a mixed audio stream to be outputted, S4 to the user, e.g. at the user's headphones 150. The formation of the mixed audio stream may for example include making an amplitude of the separate audio streams to be dependent on the corresponding control signal. As an example, if the first audio stream corresponds to vocals, and the user decides to arrange the first 112 interface means at a maximum end point, whereas the remaining interface means 114, 116, 118 are arranged at a minimum end point, the mixed audio stream experienced at the headphones 150 of the user may only correspond to the vocals (e.g. "a cappella").

The control signals from the interface means 112, 114, 116, 118 may as an alternative be used for imposing different "features" to e.g. the separate audio stream. As an example, it could be possible to allow the different interface means 112, 114, 116, 118 to impose different filters, delays, distortion and or gate effects to the different audio streams, to be included with the formed mixed audio stream.

Furthermore, a corresponding control signal from the speed interface means 120 may be used for affecting one of the audio streams or the mixed audio stream.

Possibly, and as indicated above, the user may be allowed to view a visualization of one of the audio streams or the mixed audio stream. As such, the user could possibly take the visualization into account when interacting with the music player 100.

In another example of interacting with the music player 100, the use may select to connect an external music device 170 to the music player 100. As indicated in FIG. 1 such an external music device 170 may be a drum machine. For example, in case the second audio stream comprise the base beat portion, it may be possible for the user to arrange only the second interface means 114 at the minimum end point, such that the artist provided base beat portion is removed from the mixed audio stream received at the user's headphones 150. Rather, the user may instead manipulate the external music device 170 to form a user decided base beat portion that is comprised with the mixed audio stream received at the user's headphones 150.

The control functionality of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art.

In addition, variations to the disclosed embodiments can be understood and effected by the skilled addressee in practicing the claimed present disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A portable interactive music player adapted to output a mixed audio stream, comprising:
- a memory device configured to store a first audio track and a second audio track in a digital format,
- an output device configured to output the mixed audio stream,
- first and second interface elements controllable by a user, wherein each of the first and second interface elements comprises at least one of a rotatable knob, a button or a slider,
- at least one processor connected to the memory device, the output device and the first and second user interface elements, and
- a housing, wherein the memory device and the at least one processor are arranged within the housing, and the first and second interface elements are controllable from an outside of the housing,
- wherein the at least one processor is configured to:
  - receive a first control signal and a second control signal from the first and second interface elements, respectively, wherein the user interacts with the first and second interface elements to generate the first and second control signals in order to control at least one of a plurality of attributes of the first and second audio tracks, respectively,
  - simultaneously play the first and second audio tracks streams stored at the memory device based on the first and second control signals,
  - form the mixed audio stream by mixing and synchronizing the simultaneously played first and second audio stream and tracks, wherein the forming and synchronization of the mixed audio stream is based on the first and second control signals, and
  - output the mixed audio stream using the output device.

2. The portable interactive music player according to claim 1, wherein the memory device is further adapted to store a third audio track and a fourth audio track, and the portable interactive music player further comprises a third interface element and a fourth interface element, wherein the third and fourth interface elements each comprise at least one of a rotatable knob, a button or a slider.

3. The portable interactive music player according to claim 1, further comprising an audio connector adapted to receive an audio plug, wherein the audio connector is connected to the at least one processor.

4. The portable interactive music player according to claim 3, wherein an audio stream received at the audio connector is comprised with the mixed audio stream.

5. The portable interactive music player according to claim 1, wherein output device comprises a Bluetooth transceiver.

6. The portable interactive music player according to claim 1, further comprising a battery for powering the portable interactive music player.

7. The portable interactive music player according to claim 1, further comprising a speed interface element controllable from an outside of the housing, wherein the at least one processor is adapted to receive a speed control signal from the speed interface element for controlling a speed of the mixed audio stream.

8. The portable interactive music player according to claim 1, further comprising a display connected to the at least one processor, wherein the at least one processor is further adapted to form a visualization of the mixed audio stream to be displayed at the display.

9. The portable interactive music player according to claim 1, further comprising a high-speed data port for receiving the first and second audio tracks to be stored at the memory device.

10. A computer implemented method for operating a portable interactive music player, the portable interactive music player comprising:
- a memory device configured to store a first audio track and a second audio track in a digital format,
- an output device configured to output a mixed audio stream,
- first and second interface elements controllable by a user, wherein each of the first and second interface elements comprises at least one of a rotatable knob, a button or a slider,
- at least one processor connected to the memory device, the output device and the first and second user interface elements, and
- a housing, wherein the memory device and the at least one processor are arranged within the housing, and the first and second interface elements are controllable from an outside of the housing,
- wherein the method comprises:
  - storing a first audio track and a second audio track at the memory device,
  - receiving, at the at least one processor, a first control signal and a second control signal from the first and second interface elements, respectively, wherein the user interacts with the first and second interface elements to generate the first and second control signals in order to control at least one of a plurality of attributes of the first and second audio tracks, respectively,
  - simultaneously playing, using the at least one processor, the first and second audio tracks stored at the memory device based on the first and second control signals,
  - forming, using the at least one processor, the mixed audio stream by mixing and synchronizing the simultaneously played first and second audio tracks, wherein the forming and synchronization of the mixed audio stream is based on the first and second control signals, and
- outputting, using the at least one processor and the output device, the mixed audio stream.

11. A computer program product comprising a non-transitory computer readable medium having stored thereon computer program means operating a portable interactive music player, the portable interactive music player comprising:
- a memory device configured to store a first audio track and a second audio track in a digital format,
- an output device configured to output a mixed audio stream,
- first and second interface elements controllable by a user, wherein each of the first and second interface elements comprises at least one of a rotatable knob, a button or a slider,
- at least one processor connected to the memory device, the output device and the first and second user interface elements, and
- a housing, wherein the memory device and the at least one processor are arranged within the housing, and the first and second interface elements are controllable from an outside of the housing,
- wherein the computer program product comprises:
  - code for storing a first audio track and a second audio track at the memory device,
  - code for receiving, at the at least one processor, a first control signal and a second control signal from the first and second interface elements, respectively, wherein the user interacts with the first and second interface elements to generate the first and second control signals in order to control at least one of a plurality of attributes of the first and second audio tracks, respectively,
  - code for simultaneously playing, using the at least one processor, the first and second audio tracks stored at the memory device based on the first and second control signals,
  - code for forming, using the at least one processor, the mixed audio stream by mixing and synchronizing the simultaneously played first and second audio tracks, wherein the forming and synchronization of the mixed audio stream is based on the first and second control signals, and
  - code for outputting, using the at least one processor and the output device, the mixed audio stream.

* * * * *